US012631512B2

(12) United States Patent
Werdecker et al.

(10) Patent No.: US 12,631,512 B2
(45) Date of Patent: May 19, 2026

(54) METHOD FOR MONITORING A SLIP-RING SEAL ASSEMBLY, AND SLIP-RING SEAL ASSEMBLY

(71) Applicant: EagleBurgmann Germany GmbH & Co. KG, Wolfratshausen (DE)

(72) Inventors: Ferdinand Werdecker, Walchensee (DE); Michael Müller, Bichl (DE); Dieter Klusch, Penzberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 396 days.

(21) Appl. No.: 18/267,948

(22) PCT Filed: Dec. 7, 2021

(86) PCT No.: PCT/EP2021/084502
§ 371 (c)(1),
(2) Date: Jun. 16, 2023

(87) PCT Pub. No.: WO2022/135898
PCT Pub. Date: Jun. 30, 2022

(65) Prior Publication Data
US 2024/0035915 A1      Feb. 1, 2024

(30) Foreign Application Priority Data
Dec. 21, 2020   (DE) ..................... 10 2020 134 365.5

(51) Int. Cl.
*G01M 3/02*           (2006.01)
(52) U.S. Cl.
CPC ..................................... *G01M 3/02* (2013.01)

(58) Field of Classification Search
CPC .... F16J 15/3492; G01M 3/02; G01M 13/005; G01M 3/005
See application file for complete search history.

(56) References Cited

U.S. PATENT DOCUMENTS 4,691,276 A * 9/1987 Miller .................... F16J 15/346
277/377
2015/0330173 A1* 11/2015 Trivedi ................. E21B 47/117
73/152.29
(Continued)

FOREIGN PATENT DOCUMENTS

CN          109991314 A        7/2019
DE          19724308 A1       12/1998
(Continued)

OTHER PUBLICATIONS

International Search Report issued in PCT/EP2021/084502, mailed Mar. 25, 2022.
(Continued)

*Primary Examiner* — Jennifer Bahls
(74) *Attorney, Agent, or Firm* — Troutman Pepper Locke LLP; Scott D. Wofsy; Gabrielle L. Gelozin

(57)                    ABSTRACT
The invention relates to a method of monitoring a mechanical seal arrangement (1) comprising the steps of: acquiring operational data of an individual mechanical seal arrangement (1) on a test bench (11), the acquired operational data being defined as the nominal data (17), incorporating the individual mechanical seal arrangement (1) into a sealing system (12), acquiring operational data from the individual mechanical seal arrangement (1) in the condition incorporated into the sealing system (12), the acquired operational data being defined as the actual data (18), and comparing the nominal data (17) with the actual data (18).

16 Claims, 2 Drawing Sheets

(56)     References Cited

U.S. PATENT DOCUMENTS

Figure 1:
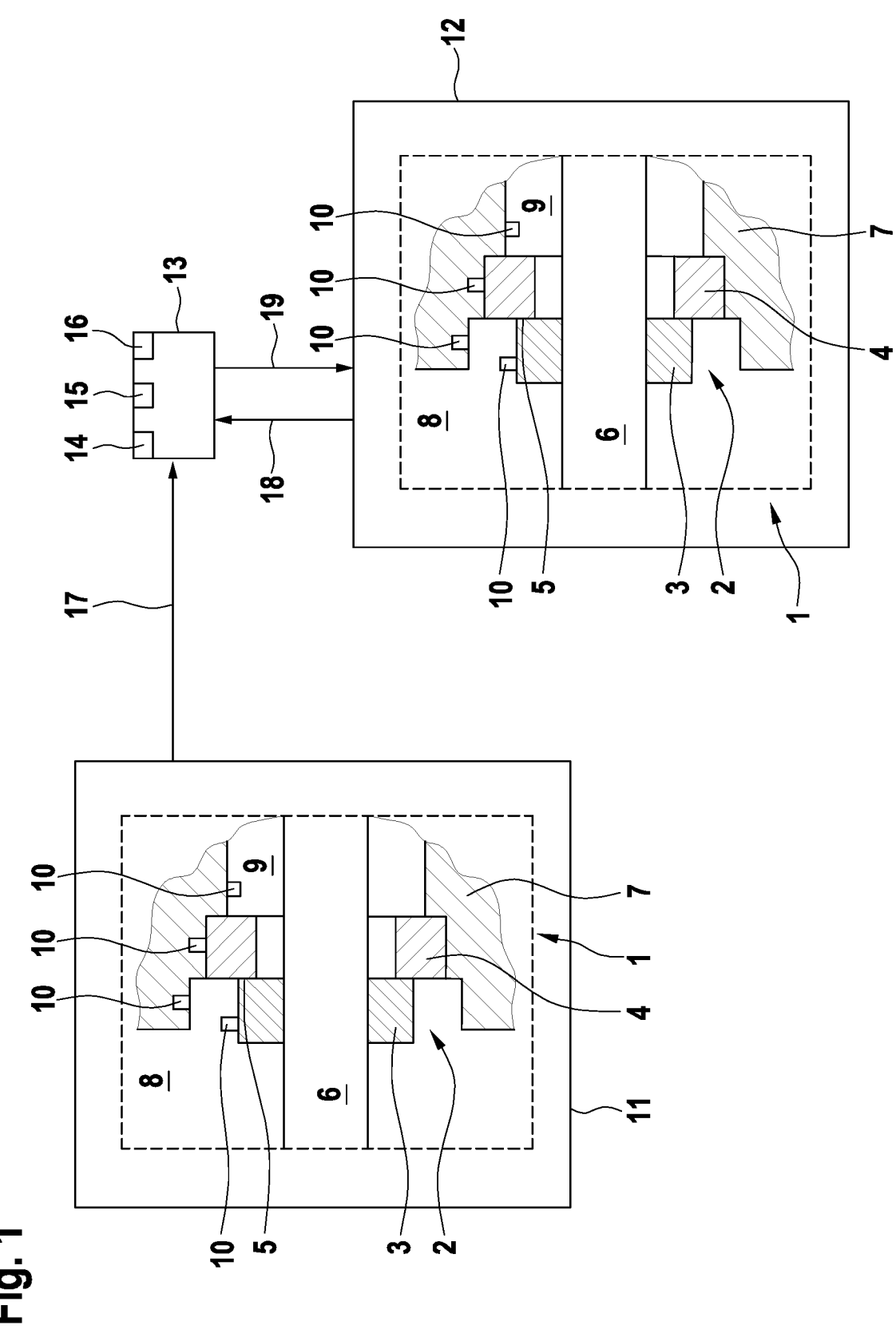

| | | | |
|---|---|---|---|
| 2017/0241955 | A1 | 8/2017 | Meck et al. |
| 2021/0335062 | A1 * | 10/2021 | Claessens ................ G06N 7/01 |
| 2022/0034849 | A1 * | 2/2022 | Nashed ............... G01M 13/005 |
| 2023/0080379 | A1 * | 3/2023 | Rider .................... G06N 20/00 |
| | | | 706/12 |

FOREIGN PATENT DOCUMENTS

| | | | | |
|---|---|---|---|---|
| EP | 2362122 | A2 * | 8/2011 | ........... F16J 15/3492 |
| EP | 3502525 | A1 * | 6/2019 | ........... F16J 15/3492 |
| JP | S60172056 | U | 11/1985 | |
| WO | 2021/133662 | A1 | 7/2021 | |

OTHER PUBLICATIONS

Office Action issued in corresponding Chinese Patent Application No. CN 202180085171.7, mailed Dec. 20, 2025. (English translation).
Chinese textbook cited in Chinese Office Action.

* cited by examiner

METHOD FOR MONITORING A SLIP-RING SEAL ASSEMBLY, AND SLIP-RING SEAL ASSEMBLY

CROSS-REFERENCE TO RELATED APPLICATIONS

This application is a U.S. National Phase Application filed under 35 U.S.C. § 371, based on International Patent Application No. PCT/EP2021/084502, filed Dec. 7, 2021, which claims priority to German Patent Application No. 10 2020 134 365.5, filed on Dec. 21, 2020, which are incorporated herein by reference.

The present invention relates to a method of monitoring a mechanical seal arrangement based on test bench data and operational data of an individual mechanical seal arrangement, as well as a mechanical seal arrangement with a computer unit for performing the method and a machine, in particular a compressor, having such mechanical seal arrangement.

Mechanical seal arrangements are known from prior art in various designs. Mechanical seal arrangements are intended to perform important sealing functions in a wide variety of machines and devices, and in particular to seal off media that are critical to the environment. Reliable sealing is therefore essential over the service life of the mechanical seal arrangement. It should be possible to monitor the mechanical seal arrangement and, in particular, to detect any failure of the mechanical seal arrangement at an early stage and to take appropriate countermeasures, for example shortening a maintenance interval or the like, if required. It is known, for example, to install temperature sensors as close as possible to the sliding rings of the mechanical seal arrangement to monitor the temperature of the mechanical seal components. When critical temperatures are reached, this may indicate that the mechanical seal arrangement may have a technical problem. One set of problems in this respect, however, relates to the fact that mechanical seal arrangements frequently are not mass-produced components, but are individually designed for the respective application, both in terms of geometry (e.g., diameter of the sliding rings) and with regard to the most varying conditions of use (e.g., pressures, temperatures, most different media). Therefore, solely performing a general temperature monitoring of the mechanical seal arrangement is not always sufficient to make meaningful assessments of the condition of the mechanical seal arrangement.

It is therefore the object of the present invention to provide a method of monitoring a mechanical seal arrangement, as well as a mechanical seal arrangement and a machine, which enables improved monitoring of the mechanical seal arrangement while being simple in design and inexpensive in manufacture.

This object will be achieved by providing a method having the features of claim 1, a mechanical seal arrangement having the features of claim 12, and a machine having the features of claim 15. The respective subclaims show preferred further embodiments of the inventions.

The method according to the invention for monitoring a mechanical seal arrangement having the features of claim 1 has the advantage that an exact and individual monitoring of individual mechanical seal arrangements is possible. This significantly improves the informative value of data individually recorded for a respective mechanical seal arrangement. According to the invention, individual data are thus used for monitoring for each individual mechanical seal arrangement. According to the invention, this will be achieved by individually putting the mechanical seal arrangement into operation on a test bench prior to actual operation in a sealing system, and thereby recording test bench data which are defined as the nominal data. Thus, individual nominal data of an individual mechanical seal arrangement can be generated on the test bench. Subsequently, the mechanical seal arrangement tested in this way is installed in a sealing system, and then operational data of this installed individual mechanical seal arrangement are recorded in the sealing system in the installed state, with the recorded data being defined as the actual data. Then, a nominal-actual comparison of the nominal data with the actual data is performed to monitor the mechanical seal arrangement. Thus, it is possible to obtain specific individual data for every single mechanical seal arrangement, and thus to define individual threshold values and/or other data indicating any potential failure or problem of the individual mechanical seal arrangement.

Test bench data and/or operational data for the individual mechanical seal arrangement may include, for example, temperature, pressure, leakage, speed, clearance height, vibration, and/or structure-borne noise. Additionally, environmental data, such as temperature of the medium to be sealed, ambient temperature, pressure of the medium to be sealed, type of medium to be sealed, or the like, may also be included in the monitoring.

Thus, using the method according to the invention, specific evaluation of the monitoring procedure of the mechanical seal arrangement can be performed with the highest accuracy within a very short time. In particular, the monitoring procedure is not very computationally elaborate, so that real-time monitoring is possible without long computation times. In particular, the comparison of nominal and actual data can be performed at any operating point of the present mechanical seal arrangement.

Preferably, the method according to the invention is intended to take countermeasures and/or issue a warning if any deviation is detected between the nominal data and the actual data that exceed a predetermined threshold value. As countermeasures, for example, a rotational speed of the mechanical seal arrangement can be reduced or increased cooling can be performed, for example by increasing a flow rate of a barrier fluid. Furthermore, a pressure of the medium and/or a pressure of the supply medium can also be changed.

Further preferably, the actual data in a digital twin of the installed individual mechanical seal arrangement is used to perform a simulation of the individual mechanical seal arrangement in the digital twin. The digital twin forms a digital image of the real mechanical seal arrangement to be monitored. The digital twin is based on mathematical calculation methods and individual geometric and physical variables of the mechanical seal arrangement and performs a simulation based on the acquired individual operational data and/or the acquired individual environmental data, and/or on operational data and/or environmental data from the past.

Preferably, the simulation data generated in the digital twin is compared with the nominal data of the test bench.

Further preferably, additional individual nominal data and/or actual data of mechanical seal arrangements of the same series as the mechanical seal arrangement to be monitored are used for the simulation in the digital twin. This allows a data pool for monitoring to be significantly enlarged, thus achieving even better results with regard to monitoring.

Preferably, when the operational data of the individual mechanical seal arrangement is recorded on the test bench, the nominal data is only selectively recorded for different operating states of the mechanical seal arrangement. The intermediate data which are in the range between the selectively acquired operating states is then determined using interpolation. Thus, a complete nominal data set of the nominal data can be obtained on the test bench within a short measurement time. In in the installed state of the individual mechanical seal arrangement, monitoring will then be allowed at any desired operating point of the mechanical seal arrangement.

Most preferably, during simulation of the individual mechanical seal arrangement in the digital twin, a leakage value of the mechanical seal arrangement is determined and used as a controller variable for controlling the mechanical seal arrangement in the sealing system. If the individual leakage of the mechanical seal arrangement rises above a predetermined leakage threshold, for example, this is an indication of a potential problem. The individual leakage threshold is individually determined for each mechanical seal arrangement.

Further preferably, the nominal data recorded on the test bench is adjusted over time using actual data from the past. This makes it possible for the comparison of nominal and actual data to also consider a certain amount of wear of the mechanical seal arrangement over time.

Preferably, the recorded operational data of the individual mechanical seal are selected from data on temperature, pressure, speed, leakage across the mechanical seal, gap height of the mechanical seal, vibration at the sliding rings of the mechanical seal, structure-borne noise, surface noise, stresses and/or deformations of the sliding rings, occurrence of contacts at the sliding surfaces of the sliding rings and/or wear at the sliding rings of the mechanical seal.

Preferably, the digital twin is configured as a learning system, so that the digital twin is continuously adapted and updated on the basis of experience in operating the individual mechanical seal arrangement and/or additionally on the basis of experience in operating other mechanical seal arrangements of the same design.

Further preferably, the computer unit feeds a comparison result of the comparison of the nominal data with the actual data to a machine control system. The machine controller is configured to control a machine, in particular a compressor. The machine controller transmits control commands to the machine based on the comparison result of the target/actual comparison. In this way, for example, a rotational speed of the machine can be adjusted, whereby a rotational speed of the mechanical seal arrangement is automatically adjusted, since the mechanical seal arrangement with the rotating sliding ring is arranged on a shaft of the machine. As a result, for example, a pressure in the product area on which the mechanical seal arrangement seals can be changed so that sealing parameters of the mechanical seal arrangement will be changed accordingly. For example, when the machine speed is reduced, heat input into the mechanical seal arrangement can be reduced by simultaneously reducing the speed at the mechanical seal arrangement.

According to another preferred embodiment of the invention, the mechanical seal arrangement comprises a supply system which feeds the mechanical seal with a barrier fluid. In this context, the machine control system is configured to issue control commands to the supply system based on the comparison result of the nominal data from the test bench with the actual data of the mechanical seal arrangement. For example, control commands to the supply system can be provided such that a temperature of the barrier fluid, a pressure of the barrier fluid and/or a volume flow of the barrier fluid will be changed. The supply system preferably comprises a heating device and/or a cooling device as well as its own circulation device, for example its own compressor, so as to change a pressure and/or a mass flow of the barrier fluid.

Most preferably, measured data obtained from the supply system is transmitted to the machine control system, with the machine control system being configured to issue control commands based on the supply system and/or the machine. For example, measured data concerning a state of the barrier fluid supplied to the mechanical seal and/or a state of the barrier fluid returned from the mechanical seal can be recorded and transmitted to the machine control system. Measured data may include, for example, a temperature of the barrier fluid, a pressure of the barrier fluid, a mass flow rate of the barrier fluid, and a contamination of the recirculated barrier fluid. Furthermore, the present invention relates to a mechanical seal arrangement comprising a mechanical seal having a rotating sliding ring and a stationary sliding ring, which define a sealing gap between their sliding surfaces. In this regard, the mechanical seal arrangement comprises a plurality of sensors for sensing various operational data and/or environmental data of the mechanical seal. Furthermore, the mechanical seal arrangement comprises a computer unit which is configured to perform a comparison of the individual nominal data with the individual actual data transmitted to the computer unit.

Preferably, the computer unit comprises a digital twin of the individual mechanical seal arrangement, wherein the computer unit is configured to simulate an operation of the real mechanical seal arrangement on the digital twin based on the acquired operational data and/or environmental data and already existing individual data of the mechanical seal arrangement and/or data of mechanical seal arrangements of the same design. This may enable real-time accurate monitoring of the mechanical seal arrangement.

Further preferably, the computer unit is configured to acquire nominal data on the test bench at a plurality of individual control points and to perform interpolation of the data between the adjacent control points to determine continuous data sets of the nominal data. This allows acquisition of nominal data on the test bench to be performed in the shortest possible time and also to reduce the computing power required for the computer unit.

Further preferably, the computer unit is configured to use additional individual nominal data and/or actual data of mechanical seal arrangements originating from the same production series as the mechanical seal arrangement which is to be monitored, for the simulation. This makes it possible to improve accuracy of the monitoring and, in particular, to enable statements to be made regarding any future probability of failure of the mechanical seal arrangement, in particular on the basis of monitoring the leakage value of the individual mechanical seal.

Preferably, the mechanical seal arrangement according to the invention is a gas-lubricated mechanical seal arrangement and is further preferably used in a compressor.

Furthermore, the present invention relates to a machine, in particular a compressor, comprising a mechanical seal arrangement according to the invention and a machine controller which is configured to control the machine and/or a supply system of the mechanical seal. Most preferably, in this context, the machine control system is configured to process the supply system based on measured data of the supply system, in particular pressure, temperature, mass flow of the barrier fluid of the supply system and/or contamination of the recirculated barrier fluid, and to issue appropriate control commands.

Figure 2:
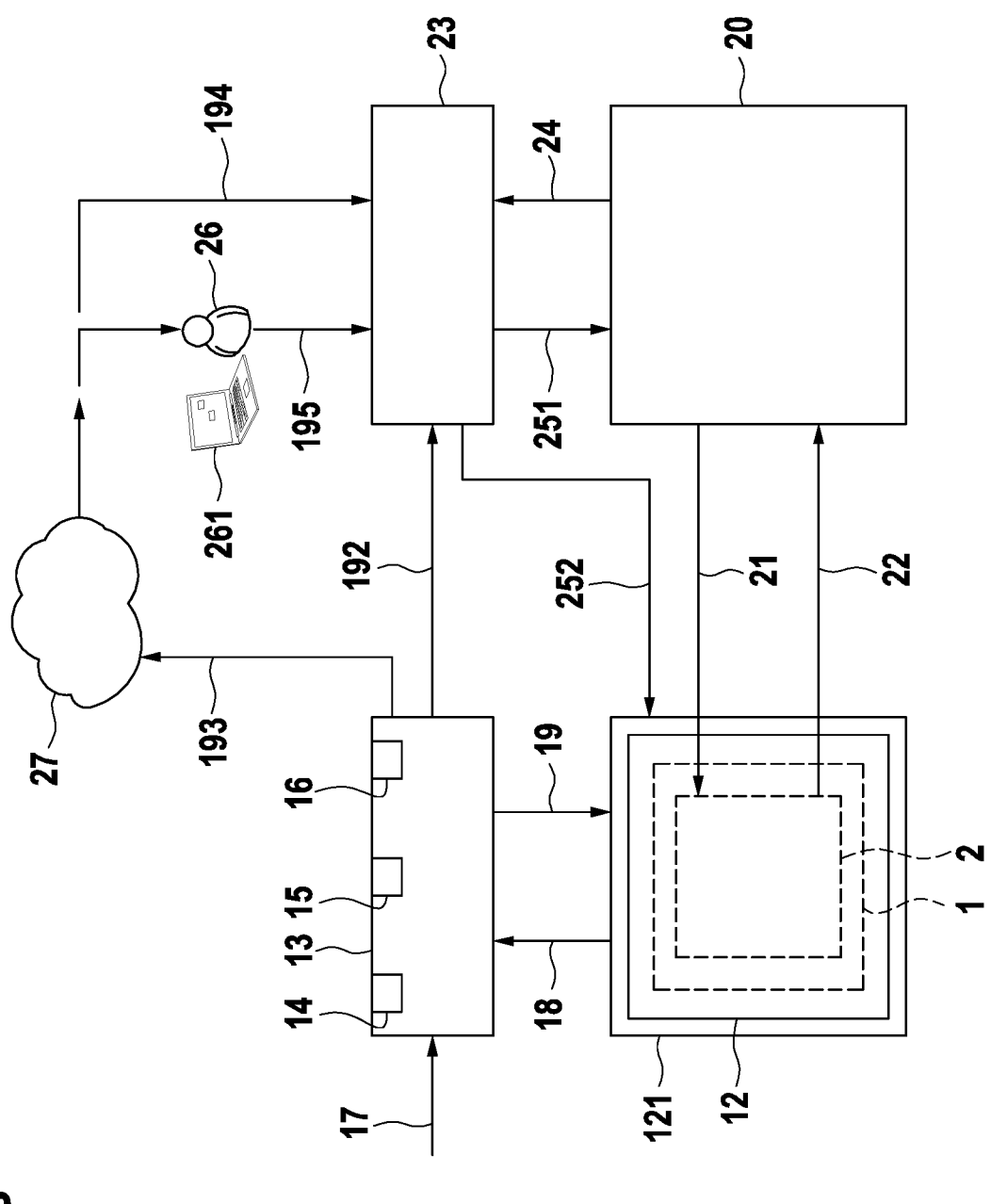

In the following, preferred examples embodiments of the invention will be described in detail while making reference to the accompanying drawing, wherein:

FIG. 1 is a schematic representation showing a method of performing the process and a mechanical seal arrangement according to a first preferred example embodiment of the invention, and FIG. 2 is a schematic representation showing a method and a mechanical seal arrangement as well as a machine according to a second example embodiment of the invention.

Referring now to FIG. 1, a method of monitoring a mechanical seal arrangement 1 and a mechanical seal arrangement 1, which can be monitored using the method according to the invention, are described in detail below according to a first example embodiment. FIG. 1 schematically shows how the method of monitoring the mechanical seal arrangement 1 is performed, as well as details of the mechanical seal arrangement 1.

The mechanical seal arrangement 1 comprises a mechanical seal 2 with a rotating sliding ring 3 arranged on a stationary sliding ring 4. A sealing gap 5 is defined between the two sealing surfaces of the rotating and stationary sliding rings 3, 4.

The mechanical seal 2 seals off a product region 8 from an atmosphere region 9 on a shaft 6. The reference number 7 designates a housing of the mechanical seal arrangement 1 on which the stationary sliding ring 4 is arranged.

Also integrated in the mechanical seal arrangement 1 are several sensors 10, which are shown schematically in FIG. 1. The sensors 10 can be arranged in or on the housing and can also be arranged on the stationary and/or rotating sliding ring 3, 4. Sensors can also be positioned on the shaft 6.

The sensors 10 are configured to detect different operating parameters such as, for example, temperature, pressure, speed, leakage of the mechanical seal, gap height at the sealing gap vibration at the sliding rings 3, 4, structure-borne noise, surface noise, stresses and/or deformations of the sliding rings 3, 4, contacts at the sliding surfaces of the sliding rings and/or wear at the sliding rings 3, 4 and to define these as operational data.

The reference number 11 designates a test bench, which is usually located at the manufacturer of the mechanical seal arrangement. An individual mechanical seal arrangement 1 is thereby tested on the test bench after its manufacture and operational data is recorded at several different operating points by means of the sensors 10 and, if necessary, further sensors arranged on the test bench. This operational data obtained on the test bench 11 are then defined as the nominal data of this individual mechanical seal arrangement 1.

The nominal data are stored in a computer unit 13 in a memory 14. In addition, the computer unit 13 is configured to process the operational data acquired at several operating points such that interpolation of operational data between two measured operating points can be realized. This is performed for all operating parameters acquired, so that a plurality of nominal data sets for different operating parameters are available as the nominal values.

The computer unit 13 furthermore comprises a comparator 15 and a digital twin 16. The digital twin 16 is a digital image of the individual mechanical seal arrangement 1 in a sealing system 12, in which the individual mechanical seal 1 is later installed in an application.

After the operational data has been recorded on the test bench 11, the individual mechanical seal arrangement 1 is then installed in the sealing system 12, in particular in a compressor.

During operation in the sealing system 12, actual data 18 are then recorded at different operating points of the mechanical seal 1 and transmitted to the computer unit 13. Thus, the operational data determined in the sealing system 12 at the customer's site during operation form the actual data 18.

The nominal data 17 and the actual data 18 are then compared with each other in the comparator 15 of the computer unit 13. Moreover, the nominal data 17 and the actual data 18 are transferred to the digital twin 16, where operation of the mechanical seal arrangement 1 is simulated.

The computer unit 13 is also configured to issue operating commands 19 to the sealing system 12, if required, to initiate appropriate countermeasures in the event of detecting a critical operating state, for example increased cooling by increasing the speed of a coolant pump or the like, or reducing a speed of the shaft 6, to avoid capital damage to the mechanical seal 2.

In this context, the digital twin 16 is preferably designed as a learning system and can thus also process an increasing number of actual data as the operating time of the mechanical seal arrangement 1 increases, which also enables, for example, a trend analysis of different operational data of the mechanical seal arrangement 1 in the sealing system 12 over time. This allows, for example, early detection of when a problem is developing and appropriate countermeasures can then be taken.

It should be noted that it is also possible for the computer unit 13 to additionally use external data from other mechanical seal arrangements of the same design which, for example, have different diameters or are used under different operating conditions and environmental conditions, e.g. different pressures and/or temperatures, and/or different media.

Thus, the invention enables real-time seal monitoring to be performed using a nominal/actual comparison, thereby ensuring proper operation of the mechanical seal arrangement 1. In this context, a comparison can be performed between the test bench data, the simulation data and also the actual data of the mechanical seal and, if necessary, appropriate measures can be taken. A leakage of the mechanical seal 2 above the sealing gap 5 is preferably used as the control variable, since in most applications it must be prevented that the medium from the product region 8 can escape into the atmosphere in the atmosphere region 9. Since a comparison of the test bench data of the individual mechanical seal arrangement 1 with the actual data of this mechanical seal arrangement 1 in the application area of the sealing system 12 is made possible, and no comparison of the actual data with theoretical data determined, for example, during a design of the mechanical seal arrangement 1 is possible, a much more accurate and faster monitoring of the mechanical seal arrangement 1 can be realized. In addition, still further monitoring can be performed using the simulation data from the digital twin 16. In this case, monitoring can be performed with minor computational effort and in a very short time, so that countermeasures can also be initiated quickly if necessary.

FIG. 2 shows a method, a mechanical seal arrangement 1 and a machine 121 having a sealing system 12 according to a second example embodiment of the invention. Equal or functionally equal parts are designated with the same reference numbers as in the first example embodiment. For the sake of clarity, the test bench 11 from which the test bench data 17 (nominal data) are transmitted to the computer unit 13 is not shown in FIG. 2, but is of course present.

In this example embodiment, the mechanical seal arrangement 1 additionally comprises a supply system 20 for the mechanical seal 2, which supplies a barrier fluid 21 to the mechanical seal 2. A return flow 22 of the barrier fluid is directed from the mechanical seal 2 back to the supply system 20. The supply system typically comprises a plurality of devices, for example for cleaning the barrier fluid 21, for heating or for cooling the barrier fluid, and a conveying unit for conveying the barrier fluid to the mechanical seal arrangement 1.

Furthermore, in the second example embodiment, a machine controller 23 is provided, which is configured to generate control data 252 and to control the machine 121, which for example is a compressor. The machine controller 23 is further configured to also feed control data 251 to the supply system 20 to control the supply system. This can be used, for example, to adjust a temperature of the barrier fluid, a pressure of the barrier fluid, and/or a mass flow rate of the barrier fluid.

As may further be seen from FIG. 2, the computer unit 13 is configured, in addition to transmitting operating commands and/or retransmitted data to the machine 121 and in particular to the mechanical seal arrangement 1, also to feed comparison data directly to the machine control 23. This is shown in FIG. 2 by the arrow 192.

Thus, a comparison result of the comparison of the nominal data 17 with the actual data 18, which is performed in the computer unit 13, is to be transmitted to the machine control 23. In this respect, the machine control unit 23 is configured to transmit control commands 252 to the machine 121 based on the comparison result. Herein, in particular, a rotational speed of the machine 121 can be controlled. Since the mechanical seal arrangement 1 is configured on the same shaft 6 as the machine 121, a speed control also directly impacts the mechanical seal 2. Furthermore, the machine control 23 is configured to transmit control commands 251 to the supply system 20, based on the comparison result. Thus, for example, a temperature, a pressure and/or a mass flow of the barrier fluid 21 can be adjusted at the supply system 20.

As may be further seen from FIG. 2, measured data 24, which is taken from the supply circuit of the supply system 20, is also supplied to the machine control 23. Such measured data may be, for example, a pressure of the barrier fluid, a temperature of the barrier fluid, a mass flow rate of the barrier fluid, and/or a degree of contamination of the barrier fluid. Accordingly, the machine controller 23 may then directly transmit control data 251 to the supply system 20 to prevent failure of the mechanical seal 2. Preferably, it is also possible for the machine control system 23 to also transmit control data 252 to the machine 121 based on the measured data 24, in particular for controlling a speed of the machine, and to control the machine 121 accordingly.

Typically, the machine control 23 and the supply system 20 are arranged at a user of the mechanical seal arrangement 1. However, as schematically shown in FIG. 2, it is also conceivable that the comparison results can be transmitted to a cloud 27, i.e., a region outside an operating region of the user of the mechanical seal arrangement (arrow 193). The data can then be used by the cloud 27, for example, to a machine operator 26 who can generate control commands 195 to the machine controller manually using a computer 261. Alternatively, the comparison results from the cloud 27 can be transmitted directly to the machine control 23 (arrow 194) and processed in the machine control 23.

In other respects, this example embodiment corresponds to the preceding example embodiment, so that reference can be made to the description given therein.

In addition to the foregoing written description of the invention, explicit reference is hereby made to the graphic representation of the invention in FIGS. 1 and 2 for supplementary disclosure thereof.

LIT OF REFERENCE NUMBERS

1 Mechanical seal arrangement
2 Mechanical seal
3 Rotating sliding ring
4 Stationary sliding ring
5 Sealing gap
6 Shaft
7 Housing
8 Product area
9 Atmosphere region
10 Sensors
11 Test bench
12 Sealing system
13 Computer unit
14 Memory
15 comparator
16 digital twin
17 Nominal data
18 Actual data
19 Operating commands/retransmitted data
20 Supply system
21 Barrier fluid (supply)
22 Return flow of barrier fluid
23 Machine control
24 Measured data
26 Machine operator
27 Cloud
121 Machine/compressor
192 Transfer of comparison results from computer unit 13 to machine control 23
193 Transfer of comparison results from computer unit 13 to cloud 27
194 Transfer of comparison results from cloud 27 to machine control 23
195 Control commands entered by the machine operator for the machine control 23
251 Control data to the supply system
252 Control data to the machine
261 Computer of the machine operator

The invention claimed is:

1. A method of monitoring a mechanical seal arrangement comprising the steps of: acquiring operational data of an individual mechanical seal arrangement on a test bench, the acquired operational data being defined as the nominal data, mounting the individual mechanical seal arrangement into a sealing system, acquiring operational data of the individual mechanical seal arrangement in the state installed in the sealing system, the acquired operational data being defined as the actual data, and comparing the nominal data with the actual data.

2. The method according to claim 1, wherein upon detection of any deviation between the nominal data and the actual data that are above a predetermined threshold value, a warning is issued and/or initiation of countermeasures is performed.

3. The method according to claim 1, wherein the actual data are used in a digital twin, which is a digital image of the mechanical seal arrangement incorporated in the sealing system, to perform simulation of the mechanical seal arrangement on the digital twin.

4. The method according to claim 3, wherein the simulation data generated in the digital twin are compared with the nominal data.

5. The method according to claim 3, wherein for the simulation in the digital twin additionally further nominal data and/or actual data of other mechanical seal arrangements belonging to the same production series as the individual, monitored mechanical seal arrangement are used.

6. The method according to claim 3, wherein a leakage value of the mechanical seal arrangement is determined during the simulation in the digital twin and is used as a controller variable for controlling the individual mechanical seal arrangement in the sealing system.

7. The method according to claim 1, wherein, in the step of acquiring the operational data of the individual mechanical seal arrangement on the test bench, nominal data are acquired only selectively for different operating states on the test bench and intermediate data in the range between the individual selectively acquired operational data are determined using interpolation to generate a complete set of nominal data.

8. The method according to claim 1, wherein monitoring the mechanical seal arrangement is performed in real time and/or wherein a trend analysis is performed using all data acquired over time.

9. The method according to claim 1, wherein a comparison result of the comparison of the nominal data with actual data is fed to a machine controller, wherein the machine controller is configured to determine and transmit control commands to a machine based on the comparison result.

10. The method according to claim 9, wherein the machine controller is further configured to determine and transmit control commands to a supply system that supplies the mechanical seal with a barrier fluid based on the comparison result.

11. The method according to claim 10, wherein measured data of the supply system are transferred to the machine controller, wherein the machine controller is configured to issue control commands to the machine and/or to the supply system based on the measured data.

12. A mechanical seal arrangement, comprising: a mechanical seal having a rotating sliding ring and a stationary sliding ring defining a sealing gap between their sliding surfaces and having a plurality of sensors, the sensors being configured to detect various operational data and/or environmental data of the mechanical seal arrangement in the sealing system as the actual data, and a computer unit including a memory in which individual operational data of the mechanical seal arrangement, which were recorded on a test bench, are stored as the nominal data, wherein the computer unit is configured to perform comparison of the nominal data with the actual data.

13. The mechanical seal arrangement according to claim 12, wherein the computer unit further comprises a digital twin of the mechanical seal arrangement, wherein the digital twin is configured to simulate an operation of the mechanical seal arrangement based on actual data of the mechanical seal arrangement.

14. The mechanical seal arrangement according to claim 12, wherein the nominal data of the mechanical seal arrangement recorded on the test bench are a plurality of individual control points, and the computer unit is configured to perform an interpolation between adjacent control points to generate respective nominal data sets of operational data recorded on the test bench, and/or wherein the computer unit is configured to perform a comparison of the simulation data of the digital twin with the nominal data and/or the actual data and/or to issue operating commands to the mechanical seal arrangement in the sealing system.

15. A machine, comprising a mechanical seal arrangement according to claim 12 and a machine controller configured to issue control commands to the machine and/or to a supply system for supplying barrier fluid to the mechanical seal.

16. The machine of claim 15, wherein the machine is a compressor.

* * * * *